(12) United States Patent
Nosker et al.

(10) Patent No.: US 8,513,360 B2
(45) Date of Patent: Aug. 20, 2013

(54) USE OF RECYCLED PLASTICS FOR STRUCTURAL BUILDING FORMS

(75) Inventors: Thomas Nosker, Stockton, NJ (US);
Richard W. Renfree, Scotch Plains, NJ (US); Maryann Renfree, legal representative, Scotch Plains, NJ (US);
James Kerstein, Watchung, NJ (US);
Louis Simon, Branchburg, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 13/178,798

(22) Filed: Jul. 8, 2011

(65) Prior Publication Data
US 2011/0265410 A1 Nov. 3, 2011

Related U.S. Application Data

(62) Division of application No. 12/870,277, filed on Aug. 27, 2010, now Pat. No. 7,996,945, which is a division of application No. 10/563,883, filed as application No. PCT/US03/22893 on Jul. 21, 2003, now Pat. No. 7,795,329.

(60) Provisional application No. 60/486,205, filed on Jul. 8, 2003.

(51) Int. Cl.
*C08J 3/00* (2006.01)

(52) U.S. Cl.
USPC ........... 525/197; 525/191; 525/240; 525/242; 52/223.7; 52/475.1; 52/578; 52/586.1; 52/782.1; 524/23; 524/494; 14/73; 14/75; 14/77.1; 14/77.3; 523/204; 264/171.11

(58) Field of Classification Search
USPC ........... 523/204, 207, 214, 513, 527; 528/30, 528/84, 85, 106, 98, 54, 58, 29, 57, 83, 90, 528/91; 264/171.1, 171.11, 171.17, 171.18, 264/241; 14/73, 73.1, 74.5, 75, 77.1, 77.3; 52/223.7, 475.1, 481.2, 478, 586.1, 782.1; 428/119, 101, 99, 54, 384, 903.3; 524/494, 524/493, 23; 525/191, 197, 240, 242
See application file for complete search history.

(56) References Cited

U.S. PATENT DOCUMENTS 1,988,201 A 1/1935 Hall
4,083,491 A 4/1978 Hill
(Continued)

FOREIGN PATENT DOCUMENTS

GB 1166954 * 10/1969
GB 1251542 A 10/1971

OTHER PUBLICATIONS

Braestrup, M.W. "Footbridge Constructed From Glass-Fibre-Reinforced Profiles, Denmark," Structural Engineering International 9(4): 256-258. (Nov. 1999).

(Continued)

*Primary Examiner* — Frances Tischler
(74) *Attorney, Agent, or Firm* — Fox Rothschild LLP

(57) ABSTRACT

Modular plastic structural composites having a web section disposed along a horizontal axis and at least one flange section disposed along a horizontal axis parallel thereto and integrally molded to engage the top or bottom surface of the web section, wherein said composite is formed from a mixture of (A) high density polyolefin and (B) a thermoplastic-coated fiber material, poly-styrene, or a combination thereof. Composites molded in the form of I-Beams and bridges constructed therefrom are also disclosed.

2 Claims, 5 Drawing Sheets

(56) References Cited

U.S. PATENT DOCUMENTS

| | | | |
|---|---|---|---|
| 5,033,147 A | * | 7/1991 | Svensson ............................ 14/73 |
| 5,182,892 A | * | 2/1993 | Chase ............................... 52/539 |
| 5,298,214 A | | 3/1994 | Morrow et al. |
| 5,609,295 A | | 3/1997 | Richards |
| 5,789,477 A | | 8/1998 | Nosker et al. |
| 5,916,932 A | | 6/1999 | Nosker et al. |
| 5,951,940 A | | 9/1999 | Nosker et al. |
| 6,103,211 A | | 8/2000 | Matsuhisa et al. |
| 6,191,228 B1 | | 2/2001 | Nosker et al. |
| 6,216,409 B1 | * | 4/2001 | Roy et al. ...................... 52/589.1 |
| 6,247,651 B1 | | 6/2001 | Marinelli |
| 6,397,547 B1 | * | 6/2002 | Martensson ................. 52/582.1 |

OTHER PUBLICATIONS

"Recycled Plastic Forms Bridge Beams," Environment New Service, www.ens-news.com (Jan. 21, 2003).

\* cited by examiner

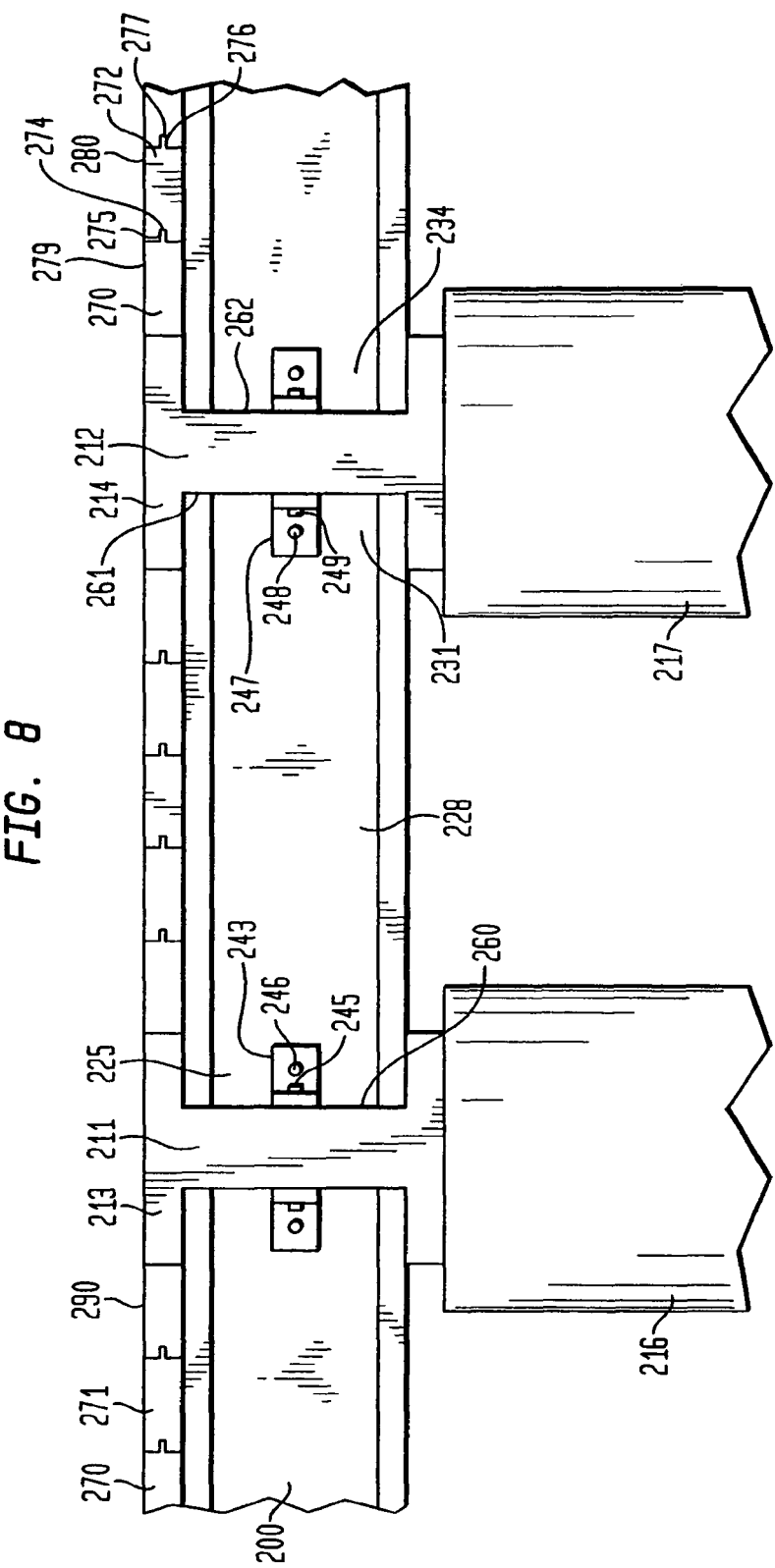

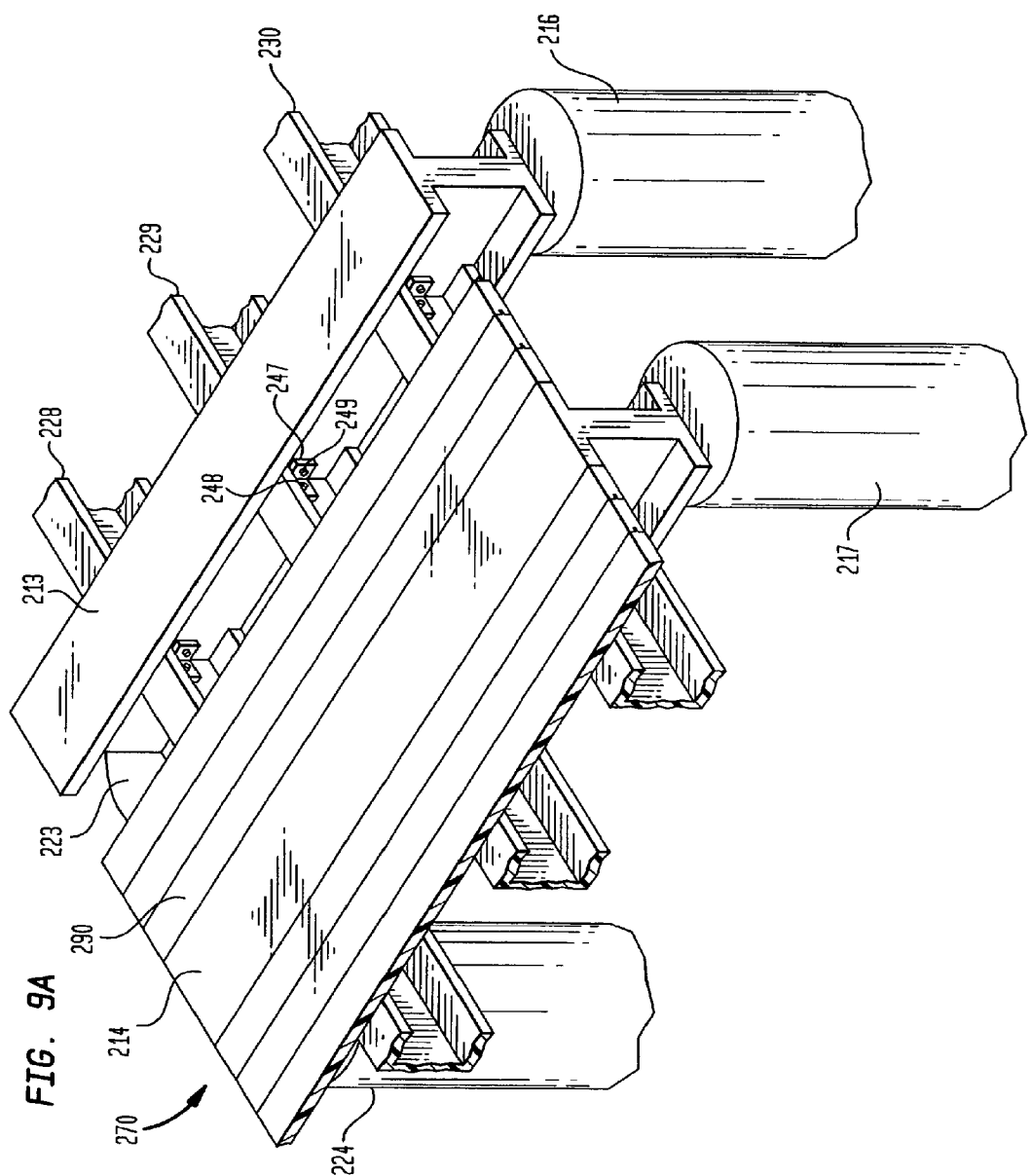

USE OF RECYCLED PLASTICS FOR STRUCTURAL BUILDING FORMS

CROSS-REFERENCE TO RELATED APPLICATIONS

This application is a divisional of U.S. patent application Ser. No. 12/870,277, filed Aug. 27, 2010, now U.S. Pat. No. 7,996,945, which is a divisional of U.S. patent application Ser. No. 10/563,883, filed on June 8, 2006, and issuing as U.S. Pat. No. 7,795,329, which is the National Stage Entry under 35 U.S.C. §371 of International Patent Application Serial No. PCT/US03/22893, filed on Jul. 21, 2003, which claims the benefit of U.S. Provisional Patent Application Ser. No. 60/486,205, filed on Jul. 8, 2003. The disclosures of all of these applications are incorporated herein by reference.

FIELD OF THE INVENTION

This invention pertains to new building forms made of degradation-resistant composites; structures produced from such novel forms; and related methods of producing and using such forms and structures.

BACKGROUND OF THE INVENTION

There presently are over 500,000 wooden vehicular bridges in the United States assembled from chemically treated lumber. An estimated forty percent of them are in need of repair or replacement.

There are several types of chemically treated lumber such as creosoted lumber and pressure treated lumber. These materials are relatively inexpensive to make and use, and they are just as versatile as any other form of wood. They also have enhanced resistance to microbial and to fungal degradation and to water.

However, the increasing popularity of chemically treated lumber has some negative repercussions that are just now being realized. Chemically treating lumber takes a perfectly useable, recyclable, renewable resource and renders it toxic. For example "pressure treated" or "CCA" lumber is treated with very poisonous chromated copper arsenic and cannot be burned. While CCA lumber can be buried, the leaching of toxic chemicals makes such disposal strategies undesirable. The disposal of creosoted lumber requires the use of special incinerators. These materials are becoming far more difficult and expensive to dispose of than to use. However, because of the long useful life of these materials, the economic and environmental impact of chemically treated lumber is just beginning to be felt.

Structural recycled plastic lumber represents a possible alternative to chemically treated lumber. U.S. Pat. Nos. 6,191,228, 5,951,940, 5,916,932, 5,789,477, and 5,298,214 disclose structural recycled plastic lumber composites made from post-consumer and post-industrial plastics, in which polyolefins are blended with polystyrene or a thermoplastic coated fiber material such as fiberglass. These structural composites presently enjoy commercial success as replacements for creosoted railroad ties and other rectangular cross-sectioned materials. The market has otherwise been limited for structural recycled plastic lumber, because it is significantly more expensive than treated wooden beams on an installed cost basis, despite the use of recycled waste plastics.

This significant cost difference became more evident in the construction of bridge structures in which pressure-treated wooden beams were replaced with structural recycled plastic lumber composite beams. While as strong as CCA treated wood, the recycled plastic composite beams were not as stiff, and tended to sag, or "creep." It was possible to compensate for this by increasing beam dimensions and using more beams of rectangular cross-section. However, this just added to the already increased cost for materials and construction in comparison to treated lumber.

Structural beams that do not "creep" can also be prepared from engineering resins such as polycarbonates or ABS. However, these are even more costly than the structural composites made from recycled plastics. There remains a need for structural materials based on recycled plastics that are more cost-competitive with treated lumber on an installed cost basis.

BRIEF SUMMARY OF THE INVENTION

It has now been discovered that the immiscible polymer blends of U.S. Pat. Nos. 6,191,228, 5,951,940, 5,916,932, 5,789,477, and 5,298,214 can be formed into structural shapes that are more cost-efficient than traditional recycled plastic structural beams with rectangular cross-sections. The structural shapes according to the present invention are molded as a single integrally-formed article and include modular forms such as I-Beams, T-Beams, C-Beams, and the like, in which one or more horizontal flanges engage an axially disposed body known in the art of I-Beams as a web. The reduced cross-sectional area of such forms represents a significant cost savings in terms of material usage without sacrificing mechanical properties. Additional cost saving are obtained through modular construction techniques permitted by the use of such forms.

Therefore, according to one aspect of the present invention, a modular plastic structural composite is provided having web section disposed along a horizontal axis and at least one flange section disposed along a horizontal axis parallel thereto and integrally molded to engage the top or bottom surface of the web section, wherein the composite is 5 formed from a mixture of (A) high density polyolefin and (B) a thermoplastic-coated fiber material, polystyrene, or a combination thereof. The high-density polyolefin is preferably high-density polyethylene (HDPE). The thermoplastic-coated fiber material is preferably a thermoplastic-coated carbon, or glass fibers such as fiberglass.

The flange dimensions relative to the dimensions of the web section cannot be so great to result in buckling of the flange sections upon the application of a load. Preferably, the vertical dimension (thickness) of the flange section is about one-tenth to about one-half the size of the vertical dimension of the web section without any flange section(s) and the width dimension of the entire flange section measured perpendicular to the horizontal axis of the flange section is about two to about ten times the size of the width dimension measured perpendicular to the horizontal axis of the web section.

Other efficient structural shapes according to the present invention include tongue-in-groove shaped boards that form interlocking assemblies. It has been discovered that interlocking assemblies reduce the required board thickness because of the manner in which the assembly distributes loads between the interlocked boards. This also represents a significant cost savings in terms of material usage without sacrificing mechanical properties, with additional cost savings also obtained through the modular construction techniques these forms permit.

Therefore, according to another aspect of the present invention, an essentially planar modular plastic structural composite is provided having a grooved side and an integrally molded tongue-forming side, each perpendicular to the plane of the composite, in which the composite is formed from a mixture of (A) high-density polyolefin and (B) a thermoplastic-coated fiber material, polystyrene, or a combination thereof, wherein the grooved side defines a groove and the tongue-forming side is dimensioned to interlockingly engage a groove having the dimensions of the groove defined by the grooved side, and the grooved side and tongue-forming side are dimensioned so that a plurality of the essentially planar modular plastic structural composites may be interlockingly assembled to distribute a load received by one assembly member among other assembly members.

Preferred planar modular plastic structural composites have at least one pair of parallel opposing grooved and tongue-forming sides, defining therebetween a width or length dimension of the composite. Preferred composites also have board-like dimensions in which the length dimension is a matter of design choice and the width dimension is between about two and about ten times the size of the height, or thickness, dimension of the composite.

The modular plastic structural composites have utility in the construction of load-bearing assemblies such as bridges. Therefore, according to yet another aspect of the present invention, a bridge is provided, constructed from the I-Beams of the present invention, having at least two pier-supported parallel rows of larger first I-beams, and a plurality of smaller second I-beams disposed parallel to one another and fastened perpendicular to and between two rows of the larger first I-Beams, wherein the top and bottom surfaces of the second I-Beam flanges are dimensioned to nest within the opening defined by the top and bottom flanges of the first I-Beams.

The distance between the rows of first I-Beams and the rows of second I-Beams will depend upon factors such as the flange and web dimensions, the plastic components of the composite and the load to be supported by the bridge. Furthermore, whether the horizontally disposed axes of the first or second I-Beams extend in the direction of travel on the bridge is a matter of design choice, which may in whole or in part depend upon the aforementioned factors.

Because the second I-Beams are nested within the opening defined by the top and bottom flanges of the first I-Beams, the top surfaces of the second I-Beams are recessed below the top surfaces of the first I-Beams by a distance that is at least the thickness dimension of the top flange of the first I-Beam. Bridges constructed according to this aspect of the present invention will therefore further include a deck surface fastened to the first or second I-Beams. Preferred deck surfaces are dimensioned to fit between the top flanges of the parallel rows of the first I-beams. Even more preferred deck surfaces have a thickness dimension selected to provide the deck surface with a top surface that is essentially flush with the top surfaces of the parallel rows of first I-Beams. Other preferred deck surfaces are formed from the essentially planar modular plastic structural composites of the present invention having interlocking grooved and tongue-forming sides.

The modular components of the present invention permit the construction of load-bearing assemblies with fewer required fasteners, reducing the initial bridge cost, as well as the long-term cost of maintaining and replacing these corrosion-prone components. The plastic composite material also outlasts treated wood and requires significantly less maintenance than wood over its lifetime, further contributing to cost savings.

The foregoing and other objects, features and advantages of the present invention are more readily apparent from the detailed description of the preferred embodiments set forth below taken in conjunction with the accompanying drawings.

BRIEF DESCRIPTION OF THE DRAWINGS

FIG. 8 depicts a side view of a bridge according to the present invention assembled from the I-Beams of the present invention;

FIG. 9A is a top cutaway view of the bridge of FIG. 8.

DETAILED DESCRIPTION OF THE INVENTION

The modular plastic structural composites of the present invention are prepared using the co-continuous polymer blend technology disclosed by U.S. Pat. Nos. 5,298,214 and 6,191,228 for blends of a high-density polyolefin and polystyrene and by U.S. Pat. No. 5,916,932 for blends of a high-density polyolefin and thermoplastic-coated fiber materials. The disclosures of all three patents are incorporated herein by reference.

As disclosed in U.S. Pat. No. 6,191,228 composite materials may be employed containing from about 20 to about 50 wt % of a polystyrene component containing at least about 90 wt % polystyrene and from about 50 to about 80 wt % of a high-density polyolefin component containing at least about 75 wt % high-density polyethylene (HDPE). Composite materials containing about 25 to about 40 wt % of a polystyrene component are preferred, and composite materials containing about 30 to about wt % of a polystyrene component are even more preferred. Polyolefin components containing at least about 80 wt % HDPE are preferred, and an HDPE content of at least about 90 wt % is even more preferred.

According to the process disclosed by U.S. Pat. No. 5,916,932 this composite may be further blended with thermoplastic-coated fibers having a minimum length of 0.1 mm so that the finished product contains from about 10 to about 80 wt % of the thermoplastic-coated fibers. U.S. Pat. No. 5,916,932 discloses composite materials containing from about 20 to about 90 wt % of a polymer component that is at least 80 wt % HDPE and from about 10 to about 80 wt % of thermoplastic-coated fibers.

The polyolefin-polystyrene composite materials suitable for use with the present invention exhibit a compression modulus of at least 170,000 psi. and a compression strength of at least 2500 psi. Preferred polyolefin-polystyrene composite materials exhibit a compression modulus of at least 185,000 psi and a compression strength of at least 3000 psi. More preferred polyolefin-polystyrene composite materials exhibit a compression modulus of at least 200,000 psi and a compression strength of at least 3500 psi.

Composite materials containing thermoplastic-coated fibers according to the present invention exhibit a compression modulus of at least 350,000 psi. The compression modulus exhibited by preferred fiber-containing materials is at least 400,000 psi. The composite materials containing thermoplastic-coated fibers exhibit a compression strength of at least 4000 psi. The compression strength exhibited by preferred fiber-containing materials is at least 5000 psi.

Figure 1:
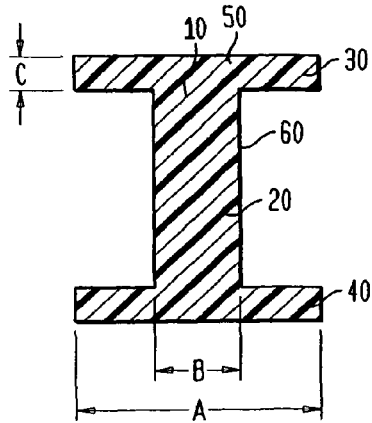
FIG. 1 depicts a cross-sectional view of an I-Beam according to the present invention.
Figure 2:
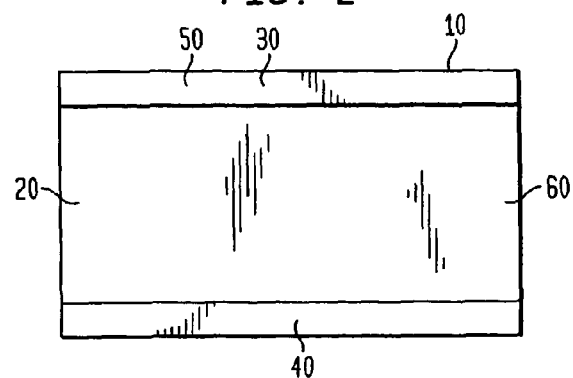
FIG. 2 is a side-view of the I-Beam of FIG. 1, perpendicular to the cross-sectional view.

A cross-sectional view of an I-Beam 10 according to the present invention is depicted in FIG. 1, with a side view of the same I-Beam shown in FIG. 2. The I-beam has a traditional structure consisting of middle "web" or "body" section 20, an upper flange 30, and a lower flange 40. The flange sections include a protruding section 50 that extends beyond the width of the web 20. The face of the web 60 forms a structure that can engage other structures (e.g., smaller beams), as described further below. The width A of the flange sections is significantly wider than the width B of the web section. The height C of the flange sections is smaller than the height of the web sections. Despite the thin height of the flange section and the narrow width of the web section, the I-Beam is capable of supporting heavy structures and can be used in load-bearing structures, such as bridges and the like.

Figure 3:
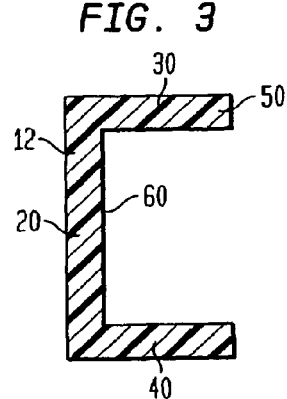
FIG. 3 depicts a cross-sectional view of a C-Beam according to the present invention.
Figure 4:
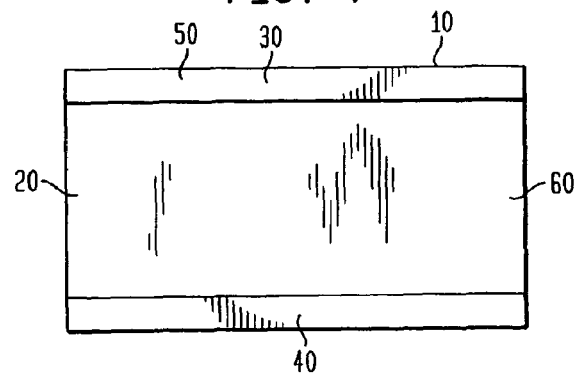
FIG. 4 is a side view of the C-Beam of FIG. 3, perpendicular to the cross-sectional view.

A cross-sectional view of a C-Beam 12 according to the present invention is depicted in FIG. 3, with a side view of the same C-Beam shown in FIG. 4. The C-beam also has a middle web section 20, an upper flange 30, and a lower flange 40. The flange sections also include a protruding section 50 that extends beyond the width of the web 20. The face of the web 60 also forms a structure that can engage other structures (e.g., smaller beams), as described further below.

Figure 5:
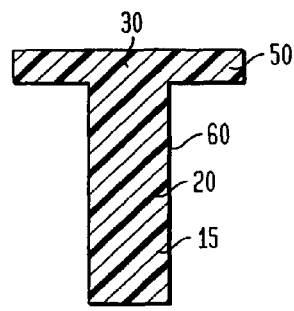
FIG. 5 depicts a cross-sectional view of a T-Beam according to the present invention.
Figure 6:
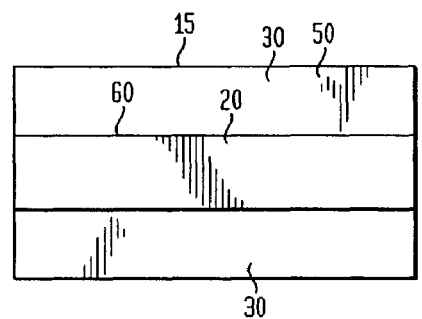
FIG. 6 is a bottom view of the T-Bean of FIG. 5.

A cross-sectional view of a T-Beam 15 according to the present invention is depicted in FIG. 5, with a bottom view of the same T-Beam shown in FIG. 6. The T-beam has a structure consisting of middle web section 20 and an upper flange 30, but no lower flange. The flange section also includes a protruding section 50 that extends beyond the width of the web 20. The face of the web 60 also forms a structure that can engage other structures (e.g., smaller beams), as described further below.

Figure 7:
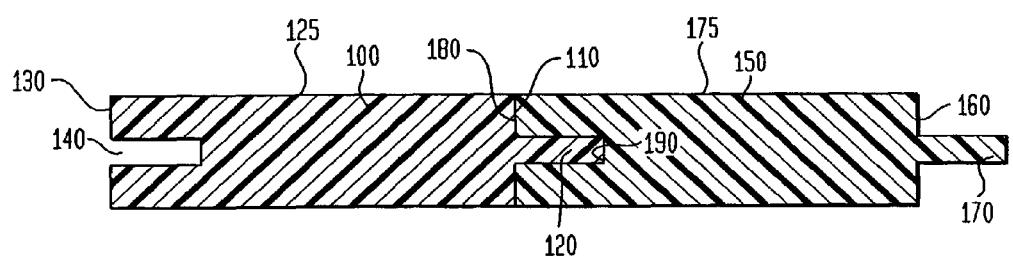
FIG. 7 depicts a cross-sectional view of tongue and groove decking panels according to the present invention.

FIG. 7 shows assembled tongue-and-groove decking panels 100 and 150. Panel 100 includes an end 110 having a tongue-shaped member 120 and an opposite end 130 defining a groove 140. Panel 150 includes an end 160 having a tongue-shaped member 170 and an opposite end 180 defining a groove 190. Tongue-shaped member 120 of panel 100 is depicted interlockingly engaging the groove 190 of panel 150. The groove 140 of panel 100 is also capable of interlockingly engaging a tongue-shaped member of another panel. Likewise, the tongue-shaped member 170 of panel 150 is capable of engaging a groove of another panel. Flat top 125 of panel 100 and flat top 175 of panel 150 can serve as a load-bearing surface or barrier when such panels are assembled into a structure.

Figure 9B:
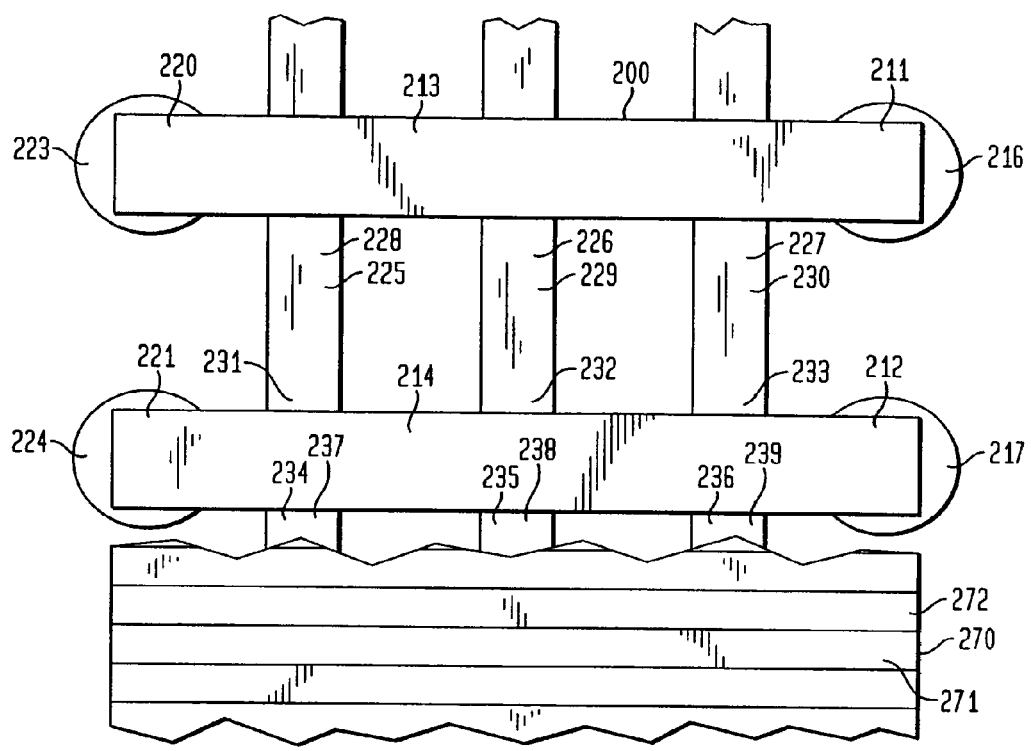
FIG. 9B is a top cutaway view of the bridge of FIG. 8.

FIG. 8 illustrates a side view and FIG. 9 a top partial cutaway view of a portion of a vehicular bridge 200 assembled from the above-described building forms. In the bridge structure, ends 211 and 212 of respective larger I-beam rails 213 and 214 are secured to respective pilings 216 and 217 by fasteners (not shown). The opposite respective I-Beam ends 220 and 221 are similarly secured to respective pilings 223 and 224. Ends 225, 226 and 227 of smaller joist I-beams 228, 229 and 230 are fastened to the face 260 of I-Beam 213, with respective opposing ends 231, 232 and 233 of the three smaller I-Beams fastened to the face 261 of I-Beam 214. Similarly, ends 234, 235 and 236 of smaller joist I-beams 237, 238 and 239 are fastened to the face 262 of I-Beam 214.

Figure 10:
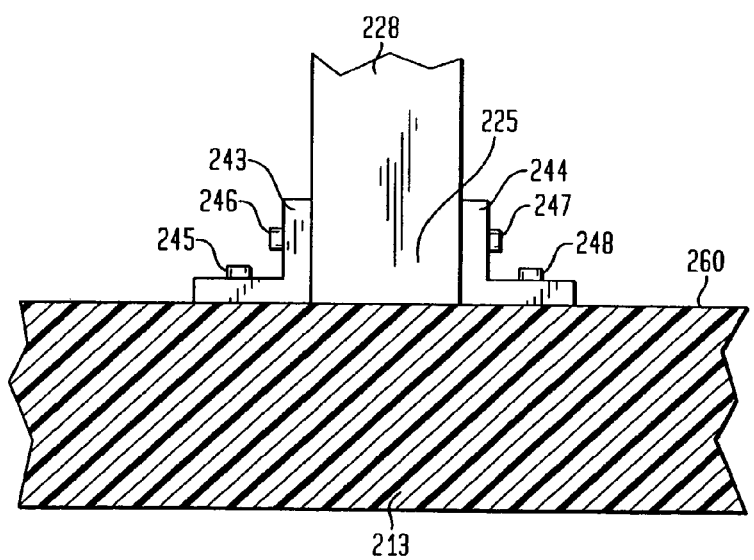
FIG. 10 is a top cutaway view depicting the perpendicular fastening of a smaller I-Beam according to present invention to a larger I-Beam according to the present invention.

FIG. 10 is a top cutaway view depicting the fastening of end 225 of smaller joist I-Beam 228 to the face 260 of larger I-Beam 213 using L-shaped brackets 243 and 244 and fasteners 245, 246, 247 and 248. Bracket 243 and fasteners 245 and 246 fastening the end 225 of I-Beam 228 to face 260 of I-Beam 213 is also shown in FIG. 8. FIG. 8 also shows bracket 247 and fasteners 248 and 249 fastening end 231 of I-Beam 228 to face 261 of I-Beam 214.

FIGS. 8 and 9 also show bridge deck 270 formed from interlocking panels 271 and 272 in which tongue 274 of panel 271 interlockingly engages groove 275 of panel 272. Tongue 276 of panel 272 interlockingly engages groove 277, and so forth. The respective top surfaces 279 and 280 of panels 271 and 272 comprise the surface 290 of bridge deck 270.

Suitable fasteners are essentially conventional and include, without limitation, nails, screws, spikes, bolts, and the like.

The molding processes disclosed in U.S. Pat. Nos. 5,298,214, 5,916,932 and 6,191,228 may be employed to form the modular plastic structural composite shapes of the present invention. However, because articles are being formed having an irregular cross section in comparison to the beams having rectangular cross-sections that were previously molded, the composite blends are preferably extruded into molds from the extruder under force, for example from about 900 to about 1200 psi, to solidly pack the molds and prevent void formation. Likewise, it may be necessary to apply force along the horizontal beam axis, for example using a hydraulic cylinder extending the length of the horizontal axis, to remove cooled modular shapes from their molds.

Composite I-Beams of polyolefin and polystyrene according to the present invention having a 61 square-inch cross-sectional area exhibit a Moment of Inertia of 900 in$^4$. Polyolefin-polystyrene composite I-Beams according to the present invention having a 119 square-inch cross-sectional area exhibit a Moment of Inertia of 4628 in$^4$. This represents the largest Moment of Inertia ever produced by any thermoplastic material for any structure, and compares to Moments of Inertial measured between 257 and 425 in$^4$ for rectangular cross-section wooden beams having a 63 square-inch cross-sectional area and Moments of Inertial measured between 144 and 256 in$^4$ for rectangular cross-section wooden beams having a 48 square-inch cross-sectional area. The end result is that a polyolefin-polystyrene composite bridge that would have weighed 120,000 pounds for the required load rating if prepared from rectangular cross-section composite materials, weighs just 30,000 pounds instead when prepared from the I-Beams of the present invention.

The modular plastic structural composites of the present invention thus represent the most cost-effective non-degradable structural materials prepared to date having good mechanical properties. The present invention makes possible the preparation of sub-structures with given load ratings from quantities of materials reduced to levels heretofore unknown.

The foregoing description of the preferred embodiment should be taken as illustrating, rather than as limiting, the present invention as defined by the claims. As would be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A planar modular plastic structural composite comprising at least one pair of a grooved side and an integrally molded tongue-forming side positioned parallel opposing to each other, defining therebetween a width or length dimension of the composite, wherein said width dimension is between about two and about ten times the size of the height (thickness) dimension of the composite, each side perpendicular to the plane of the composite, in which the composite is formed from a co-continuous immiscible polymer blend consisting essentially of a high-density polyolefin and a thermoplastic polymer-coated fiber material or a thermoplastic polymer having fiber material embedded therein, wherein the grooved side defines a groove comprising a top surface, a side surface, and a bottom surface and the tongue-forming side is dimensioned to possess a tongue-shaped member comprising a top surface, a side surface, and a bottom surface that interlockingly engage a groove having the dimensions of the groove defined by the grooved side, and the grooved side and tongue-forming side are dimensioned so that the top surface, the side surface, and the bottom surface of the tongue-shaped member directly contact each corresponding top surface, side surface, and bottom surface of the groove and a plurality of the essentially planar modular plastic structural composites may be interlockingly assembled to distribute a load received by one assembly member among other assembly members.

2. The modular plastic composite of claim 1, wherein said composite comprises from about 20 to about 90 wt % of a polymer component that is at least 80 wt % HDPE and from about 10 to about 80 wt % of thermoplastic-coated fibers.

* * * * *